(12) United States Patent
Bader

(10) Patent No.: US 11,672,290 B2
(45) Date of Patent: Jun. 13, 2023

(54) PROTECTIVE GLOVE

(71) Applicant: DUPONT SAFETY & CONSTRUCTION, INC., Wilmington, DE (US)

(72) Inventor: Yves Bader, Crozet (FR)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 0 days.

(21) Appl. No.: 17/479,157

(22) Filed: Sep. 20, 2021

(65) Prior Publication Data

US 2023/0085982 A1    Mar. 23, 2023

(51) Int. Cl.
| | | |
|---|---|---|
| A41D 19/00 | (2006.01) | |
| A41D 19/015 | (2006.01) | |
| A41D 1/00 | (2018.01) | |
| G06F 1/16 | (2006.01) | |
| G08B 31/00 | (2006.01) | |
| G08B 17/06 | (2006.01) | |
| G08B 21/18 | (2006.01) | |

(52) U.S. Cl.
CPC ....... *A41D 19/01529* (2013.01); *A41D 1/002* (2013.01); *A41D 19/01594* (2013.01); *G06F 1/163* (2013.01); *G08B 17/06* (2013.01); *G08B 21/182* (2013.01); *G08B 31/00* (2013.01)

(58) Field of Classification Search
CPC ............. A41D 19/01529; A41D 1/002; A41D 19/01594; G08B 17/06; G08B 21/182; G08B 31/00; G06F 1/163
See application file for complete search history.

(56) References Cited

U.S. PATENT DOCUMENTS

| | | | |
|---|---|---|---|
| 10,761,605 B1 * | 9/2020 | Sunshine | ............ A41D 19/0024 |
| 2007/0205903 A1 | 9/2007 | DiMarzo | |
| 2016/0175683 A1 * | 6/2016 | Caroll-James | ......... A63B 71/06 700/91 |
| 2018/0103701 A1 * | 4/2018 | Hull | .................. A41D 19/01576 |
| 2018/0344515 A1 * | 12/2018 | Ebben | .............. A41D 19/01541 |
| 2019/0012904 A1 | 1/2019 | Yusuf et al. | |
| 2019/0101573 A1 | 4/2019 | Wu et al. | |

FOREIGN PATENT DOCUMENTS

| | | |
|---|---|---|
| CN | 104597076 A | 5/2015 |
| EP | 2407039 A2 | 1/2012 |
| EP | 3097805 A1 | 11/2016 |
| EP | 3315037 A1 | 5/2018 |

OTHER PUBLICATIONS

International Search Report and Written Opinion in International Application No. PCT/US2022/074584, dated Nov. 10, 2022.

* cited by examiner

*Primary Examiner* — Ojiako K Nwugo

(57) ABSTRACT

A glove comprises a textile component and an electronic module component wherein the textile component comprises in order: a flame-resistant fabric having inner and outer surfaces, a first temperature detecting sensor located next to the inner surface of the flame-resistant fabric, at least one thermally insulating fabric having inner and outer surfaces, a second temperature detecting sensor located on the inner surface of the thermally insulating fabric that is closest to the skin of the wearer and an electronic module component capable of predicting body burns comprising a removable encapsulated electronic module located in a pocket of the glove.

7 Claims, 6 Drawing Sheets

PROTECTIVE GLOVE

BACKGROUND OF THE INVENTION

1. Field of the Invention

This invention pertains to a glove that provides protection to a wearer against heat and also alerts the wearer to a predicted external temperature increase that may put the wearer at risk. It is particularly suitable for workers in emergency and firefighting services and in occupations such as in steel works and foundries.

2. Description of Related Art

United States Patent Publication number 2019/0101573 A1 to Wu et al. describes a voltage detecting glove comprising a glove liner and an outer glove shell. A conductive antenna is disposed inside the outer glove shell but separated from the glove liner by a buffer. The antenna is connected to electronic circuitry configured to sense a voltage indicative of the proximity of the antenna to an AC electric field resulting from energized AC source, and to activate an alarm if the strength of the field exceeds a preselected threshold limit.

United States Patent Publication number 2019/0012904 A1 to Yusuf and Garrity pertains to a method for predicting occurrence of a temperature rise event caused by a fire within an environment. The method comprises receiving temperature data captured by at least one temperature sensor for sensing an ambient temperature in the environment, processing the temperature data captured by the at least one temperature sensor in a previous window of time using a trained machine learning model to determine a risk indication indicating risk of the temperature rise event occurring in a future window of time, and outputting a warning indication in dependence on the risk indication determined using the machine learning model. This is useful for providing firefighters with advance warning of dangerous temperature rises such as flashover events.

European Patent Specification 3 315 037 B1 to Pekar et al relates to a protective glove, especially for fire fighters, which comprises an electronic part with a system of temperature sensing devices which are connected to a power module and a control unit and which is coupled to a communication unit whereby the control unit is located on the back side of the glove.

European Patent Application Publication 2 407 039 A2 to Hannes pertains to a protective glove having a sensor device comprising a temperature sensor, a thermocoupler, an acceleration sensor, a barometer and/or an altimeter for detecting physical and/or chemical and/or physiological properties of a person wearing the article and/or surroundings of the person. An evaluation electronic circuit converts sensor signals of the sensor device into radio signals. A transmission device is provided to transmit the radio signals. A receiver receives the radio signals from article to be worn at a body of other person and/or a control center.

European Patent Application Publication 2 407 039 A2 to Graewer and Seiz discloses a glove with a sensor unit, the sensor unit being fastened to an outside of the glove by a fastening means. The sensor unit has a temperature sensor as a sensor component, which is designed to measure the surface temperatures of objects arranged outside the sensor unit.

BRIEF SUMMARY OF THE INVENTION

This invention pertains to a glove for protecting the back of a hand comprising: a textile component and an electronic module component wherein the textile component comprises in order:

a flame-resistant fabric having inner and outer surfaces, a first temperature detecting sensor located next to the inner surface of the flame-resistant fabric, at least one thermally insulating fabric having inner and outer surfaces, a second temperature detecting sensor located on the inner surface of the thermally insulating fabric that is closest to the skin of the wearer, and the electronic module component comprises a removable encapsulated electronic module located in a pocket of the glove, the module further comprising:

an accelerometer, a digital processor connected to the first and second temperature detecting sensors wherein the processor compares live temperature data input received from the first and second temperatures sensors, predicts via an algorithm the time until the glove protection will fail causing second degree body burn conditions to be experienced by the wearer and sends a predictive signal to an alerting device that warns the wearer of the upcoming failure event and a battery power source.

DETAILED DESCRIPTION OF THE INVENTION

Glove

Figure 1:
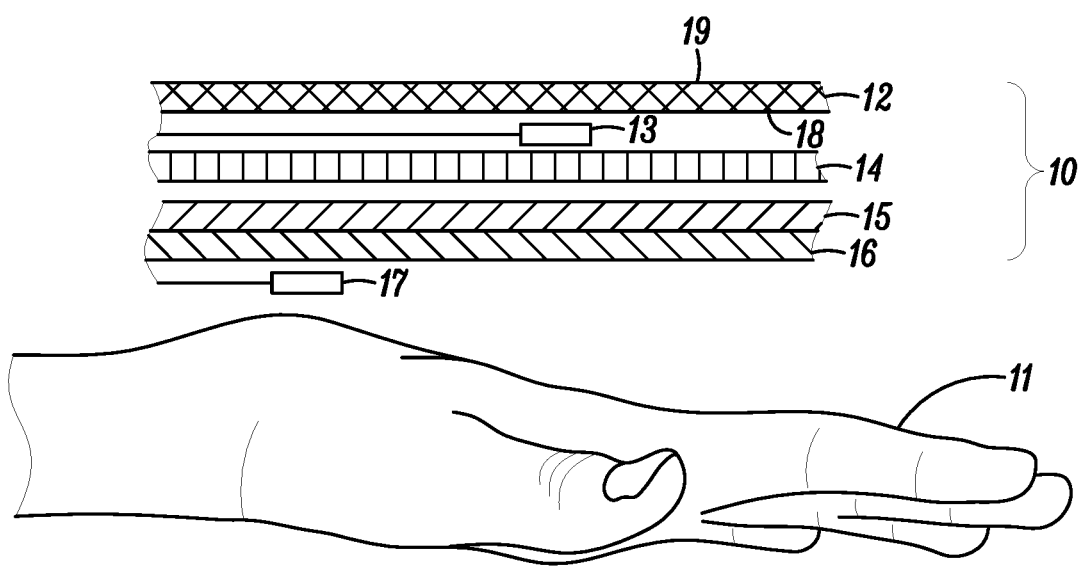
FIG. 1 is an expanded side view of the components comprising the upper half of a glove that protects the back of a hand.

A glove of this invention comprises an upper part also known as a back part and a bottom part also known as a palm part FIG. 1 shows generally at 10 an expanded view of the components comprising the upper half of a glove that protects the back of a hand 11 from heat exposure.

Figure 3:
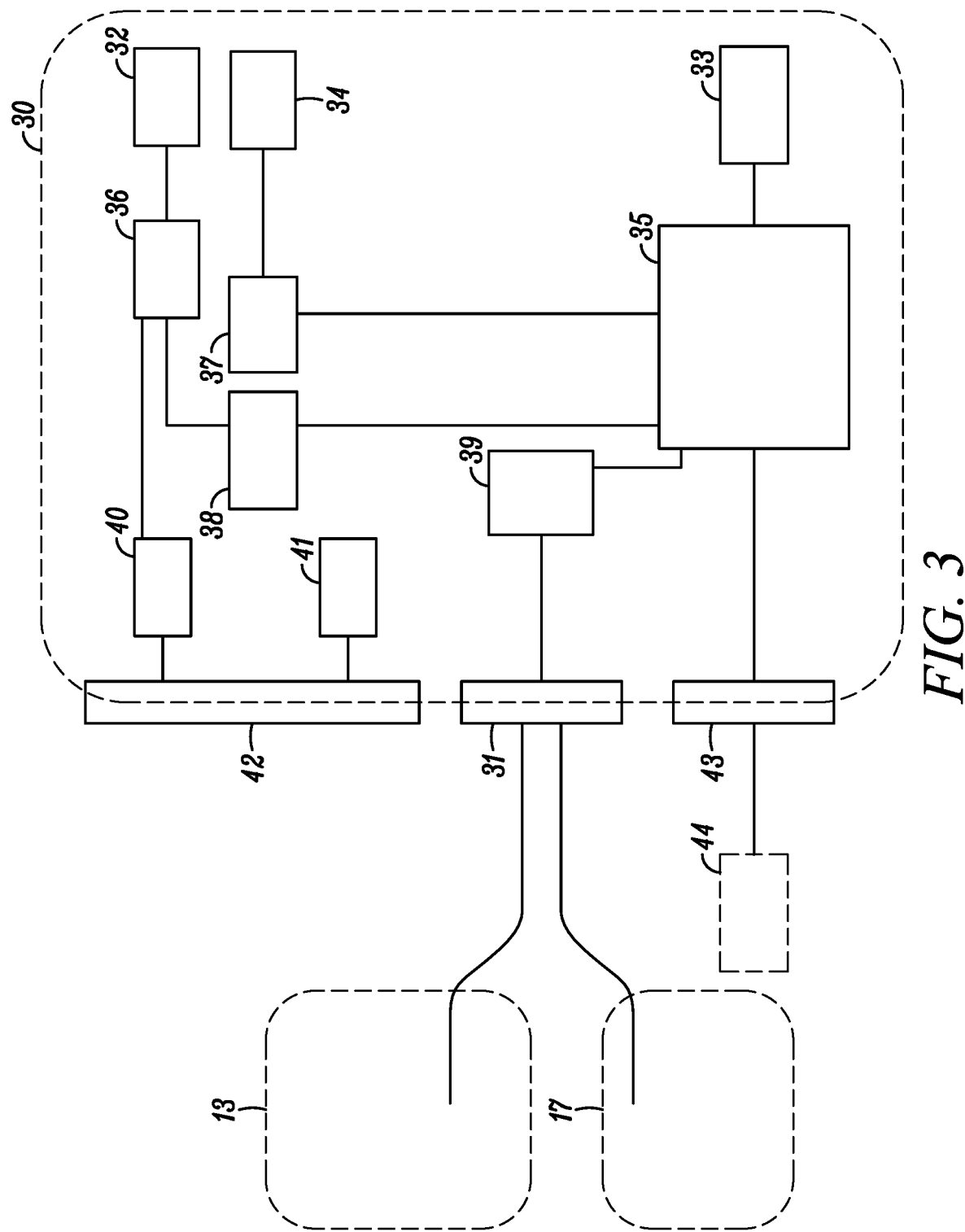
FIG. 3 is a general view of the major components and processing circuitry of the electronic module.

The upper half of the glove comprises a textile component shown in an expanded view at 10 in FIG. 1 and an electronic module component shown generally at 30 in FIG. 3.

Figure 2:
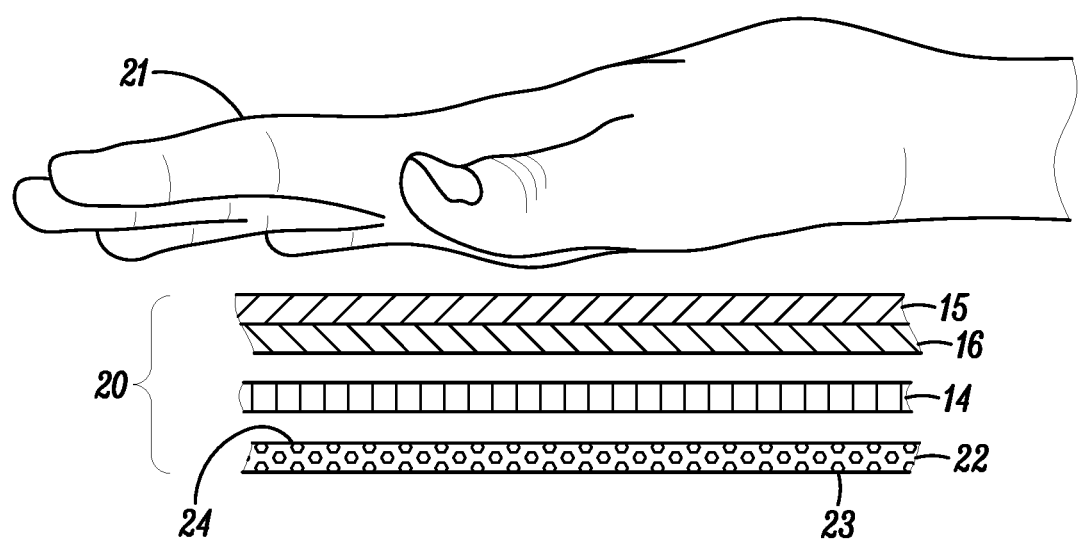
FIG. 2 is an expanded side view of the components comprising the lower half of a glove that protects the palm of a hand.

FIG. 2 shows generally at 20 an expanded view of the components comprising the lower half of a glove that protects the palm of a hand 21.

In the context of this application, an inner surface of a layer is the surface closer (proximal) to the hand and an outer surface is the surface further away (distal) from the hand.

Textile Component of the Upper Half of the Glove

The textile component 10 comprises in order:

(a) a flame-resistant fabric 12 having an inner surface 18 and an outer surface 19. This fabric is distal from the back of the wearer's hand.

(b) a first temperature detecting sensor 13 located next to the inner surface 18 of the flame-resistant fabric 12.

(c) at least one thermally insulating fabric having inner and outer surfaces. In FIG. 1, two thermally insulating fabrics 15 and 16 are shown.

(d) a second temperature detecting sensor 17 located on the inner surface of the thermally insulating fabric that is closest to the skin of the wearer and positioned so as to contact the skin.

In an alternative embodiment, the glove further comprises a water-impermeable membrane 14 located between the first temperature detecting sensor 13 and the at least one thermally insulating fabric 15.

Textile Component of the Lower Half of the Glove

The textile component 20 comprises in order:

(a) an abrasion or wear resistant material 22 having an inner surface 24 and an outer surface 23. This material is distal from the palm of the wearers hand. The material may be a woven fabric, a knit fabric or leather. The fabrics may also be coated with a rubber or polyurethane or silicone. An exemplary rubber is a nitrile rubber.

(b) at least one thermally insulating fabric layer adjacent to the palm of the hand. Two layers 15 and 16 are shown in FIG. 2.

In an alternative embodiment, the glove further comprises a water-impermeable membrane 14 located between the abrasion or wear resistant material 22 and the at least one thermally insulating fabric 15 and/or 16.

Flame-Resistant Fabric

The flame-resistant fabric 12 may be a woven or knit fabric and is of fibers that are inherently flame-resistant or are treated to render them flame-resistant. Exemplary fibers that are inherently flame-resistant include meta-aramid such as Nomex® from DuPont, Wilmington Del. Other fibers in this category include para-aramid, carbon, glass, modacrylic, polyamideimide, polybenzoxazole and polybenzimidazole. Exemplary fibers that are rendered flame-resistant are cotton, rayon and viscose. Blends of inherently flame-resistant and rendered flame-resistant fibers may also be used. The fibers may be in the form of continuous filaments, short fibers or staple fibers. Other potentially useful flame-resistant fiber could include blends of meta-aramids and flame-retardant-treated (FR) cellulose, FR cotton, FR Lyocell, modacrylic or mixtures thereof.

By "flame-resistant fiber", it is meant that a fabric made from fiber that has a char length equal to or less than 4 inches (100 mm) and an afterflame equal to or less than 2 seconds per the vertical flame test of ASTM D6143-99; The fabric also complies with Section 7.6 of NFPA 2112 Standard on Flame-Resistant Clothing for Protection of Industrial Personnel Against Short-Duration Thermal Exposures from Fire—2018. In this standard the fabric also has a char length equal to or less than 4 inches (100 mm) when tested per ASTM 6143-15.

Sometimes the words "flame" and "fire" are used interchangeably.

First Temperature Detecting Sensor

Any suitable sensor may be used. Examples include a positive temperature coefficient (PTC) resistor, a negative temperature coefficient (NTC) resistor, a K thermocouple sensor or a platinum temperature sensor In a preferred embodiment, the first temperature detecting sensor 13 is a resistance temperature detector (PT1000) comprising a metallic plate having a surface area of from 90 to 105 sq. mm and a thickness of from 0.7 to 0.9 mm. Suitable materials for the metallic plate are stainless steel, copper or aluminum.

Thermally Insulating Fabric

The number of thermally insulating fabrics layers will vary depending on the glove design, but normally there would either be one or two. In FIGS. 1 and 2, two thermally insulating fabrics 15 and 16 are shown. Sometimes thermally insulating fabrics are referred to as heat insulating fabrics, Preferably the fiber of the thermally insulating fabric is a polymeric fiber. By "thermally insulating polymeric fiber", is meant a fiber made from a synthetic organic polymer that retains 90 percent of its original fiber weight when heated in air to 500° C. at a rate of 20° C. per minute. Preferred fibers have a yarn tenacity of at least 3 grams per denier (2.7 grams per dtex). Thermally insulating polymeric fibers include para-aramid fibers, meta-aramid fibers, polyamide-imide fibers, aramid copolymer fibers, polybenzazole fibers, polybenzimidazole fibers, polyimide fibers, and mixtures thereof. Preferred fibers are para-aramid fibers, and the preferred para-aramid fiber is poly(paraphenylene terephthalamide) fiber. Natural fibers such as glass or basalt may also be utilized. Cotton or wool can be used at the inner most layer close to the skin as the temperature raise at that place is limited.

Water Impermeable Membrane

The membrane 14 is waterproof but breathable. A suitable material is polytetrafluoroethylene (PTFE). Exemplary material combined with a cross-linked polyurethane coating is available from PIL Membranes Ltd, King's Lynn, England under the tradename Porelle®. Another material is expanded polytetrafluoroethylene such as Gore-Tex from W. L. Gore Newark, Del., An alternative membrane can be a TPU flame retardant membrane.

Second Temperature Detecting Sensor

Any suitable sensor may be used. Examples include a positive temperature coefficient (PTC) resistor, a negative temperature coefficient (NTC) resistor, a K thermocouple sensor, or a platinum temperature sensor In a preferred embodiment, the second temperature detecting sensor 17 is a platinum temperature sensor PT 1000

The first and second temperature detecting sensors may be the same or different.

Electronic Module Component

FIG. 3 shows a plan view of the electronic module component 30. First and second temperature detecting sensors 13 and 17 respectively have terminals connected to a sealed plug 31, the plug being removable from the electronic module 30.

The electronic module component comprises a battery power source 32, an accelerometer 33 that activates the battery power source as a result of hand movement of the glove, an alerting device 34 and a digital processor 35 wherein the processor compares live temperature data input received from the first and second temperatures sensors, predicts via an algorithm the time until the glove thermal protection will fail causing second degree body burn conditions to be experienced by the wearer and sends a predictive signal to the alerting device 34 to warn the wearer of the upcoming failure event. Preferably the alerting device is a vibrator.

Other elements of the module are a battery protection module 36, an alarm driver 37, a battery power gauge 38, a sensor driver 39, a charger 40, a data bus connector 41, an optional charging bay connector 42, an optional switch connector 43, and an external on/off switch 44. Preferably this external switch is located on the glove.

Preferably the module is encapsulated and is located in a pocket of the glove. The module is detachable from the pocket for battery charging or when the glove is being washed. A suitable location for the pocket is in the wrist area of the glove.

Any suitable battery may be used with a lithium battery or a ceramic lithium battery being representative examples.

Preferably, the vibrator has a vibration frequency of between 10,000 to 20,000 rpm. The vibrator may have a thickness of about 7 mm and a surface area of about 64 sq·mm. or a diameter of about 9 mm.

Preferably, the vibrator issues warnings in a sequence of increasing frequency and/or volume and/or duration.

An exemplary vibrator is a Pico Vibe™ encapsulated 9 mm vibration motor from Precision Microdrives Ltd, London, UK.

Algorithm

Inputs to allow an algorithm to predict the time in seconds to a second degree burn event are:
1. The running average temperature in degrees C. currently detected by the second temperature detecting sensor.
2. A ramp factor which is the mathematical derivation of the temperatures recorded by the first temperature detecting sensor over a five second period running average.
3. An insulation factor which is a material constant that depends of the insulation capability of the textile assembly. This factor will vary from glove to glove depending on the chosen materials of the textile component.
4. A stored energy factor that is relative to the glove assembly heat storing capabilities.
5. A formula that predicts temperature occurrences at a specific time in the future.

Compliance Standards

The glove construction is in compliance with the following performance standards:
 EN 659: 2003+A1: 2008—Protective Gloves for Firefighters.
 EN 388: 2016— Protective Gloves Against Mechanical Risks.
 EN 407:2004—Protective Gloves Against Thermal Risks (Heat and/or Fire).
 ISO 17493; 20160—Clothing and Equipment for Protection Against Heat—Test Method for Convective Heat Resistance Using a Hot Air Circulating Oven,
 EN ISO 1420:2020— Protective Gloves—General Requirements and Test Methods.
 IEC 60079:2021 SER Series— Explosive Atmospheres in ATEX Explosion Zones 0-20.

The glove must also be compliant with washing cycles such as ISO 6330 B6 where there are five washes each at 60° C.

EXAMPLES 20 cm×20 cm square samples of textile component were used for test evaluations. The flame-resistant fabric was a twill made with Nomex® N305 from DuPont with a weight of 230 gsm (75% meta-aramid, 25% para-aramid, 2% antistatic). The membrane was an FR polyurethane material with a nominal thickness of 40 microns. The thermally insulating fabric, which had an areal weight of 100 gsm was a 250 gsm knitted French terry fabric made with a blend of Kevlar® p-aramid yarn (66% by weight) and 34% by weight glass fiber laminated to a 100% cotton brushed interlock.

The first temperature detecting sensor consisted of a metal disc acting as a heat integrator and a PT1000 sensor glued on the back of an aluminium disc.

The second temperature detecting sensor was an NTC sensor. Both sensors were positioned as shown in FIG. 1.

Both temperature sensors were connected to appropriate components of the electronic module component which was external to the textile samples. Each sample was placed on a metallic mannequin hand with the flame-resistant layer furthest away from the hand. The hand and textile component was then placed under a heated plate. The mannequin hand had an additional temperature measuring device on its surface. The test sample and mannequin was then subjected to a heat exposure. During the exposure event, the predicted temperature from the electronic module and the additional mannequin measuring temperature device were recorded.

Figure 4:
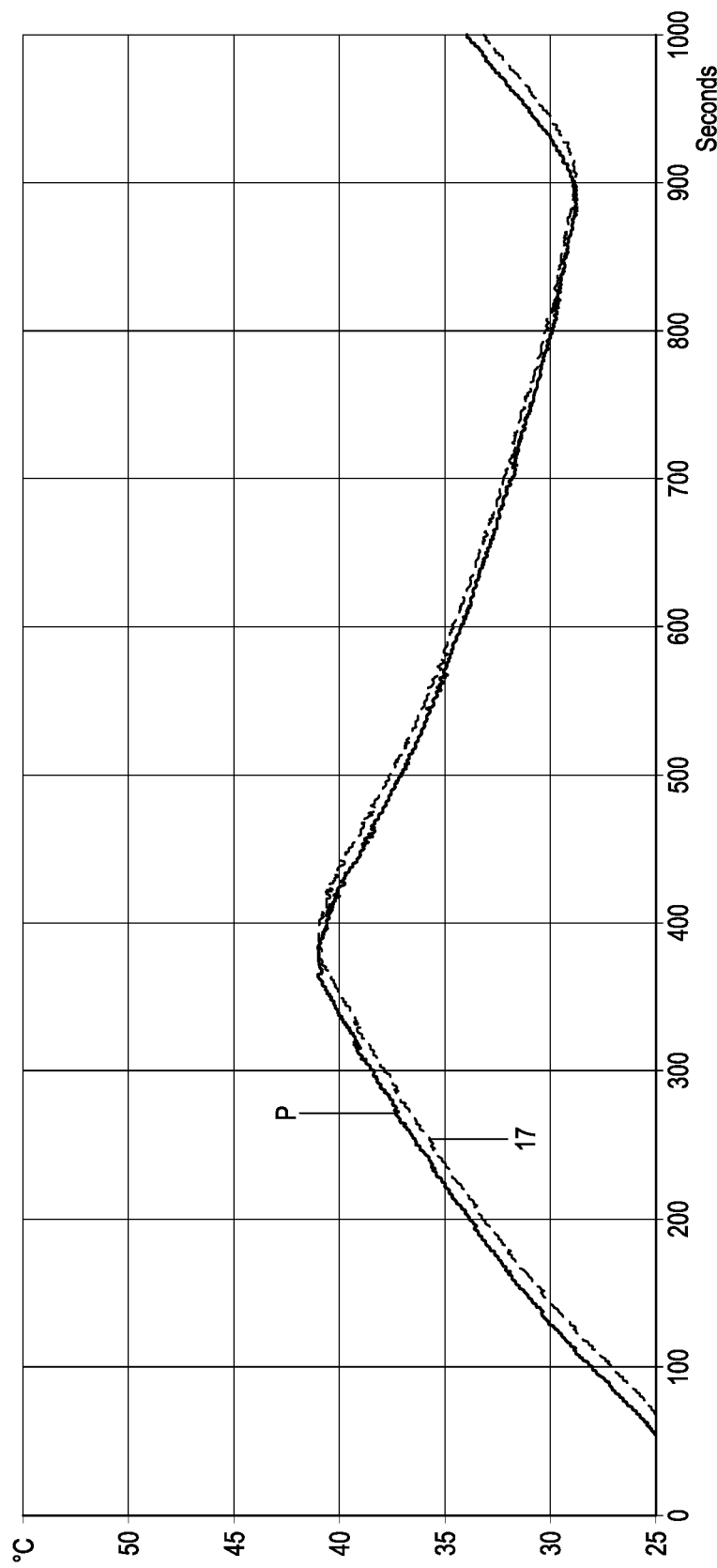
FIGS. 4 to 6 show a comparison of temperatures predicted by the algorithm of the electronic module and actual temperatures recorded experimentally at the same period in time.
Figure 5:
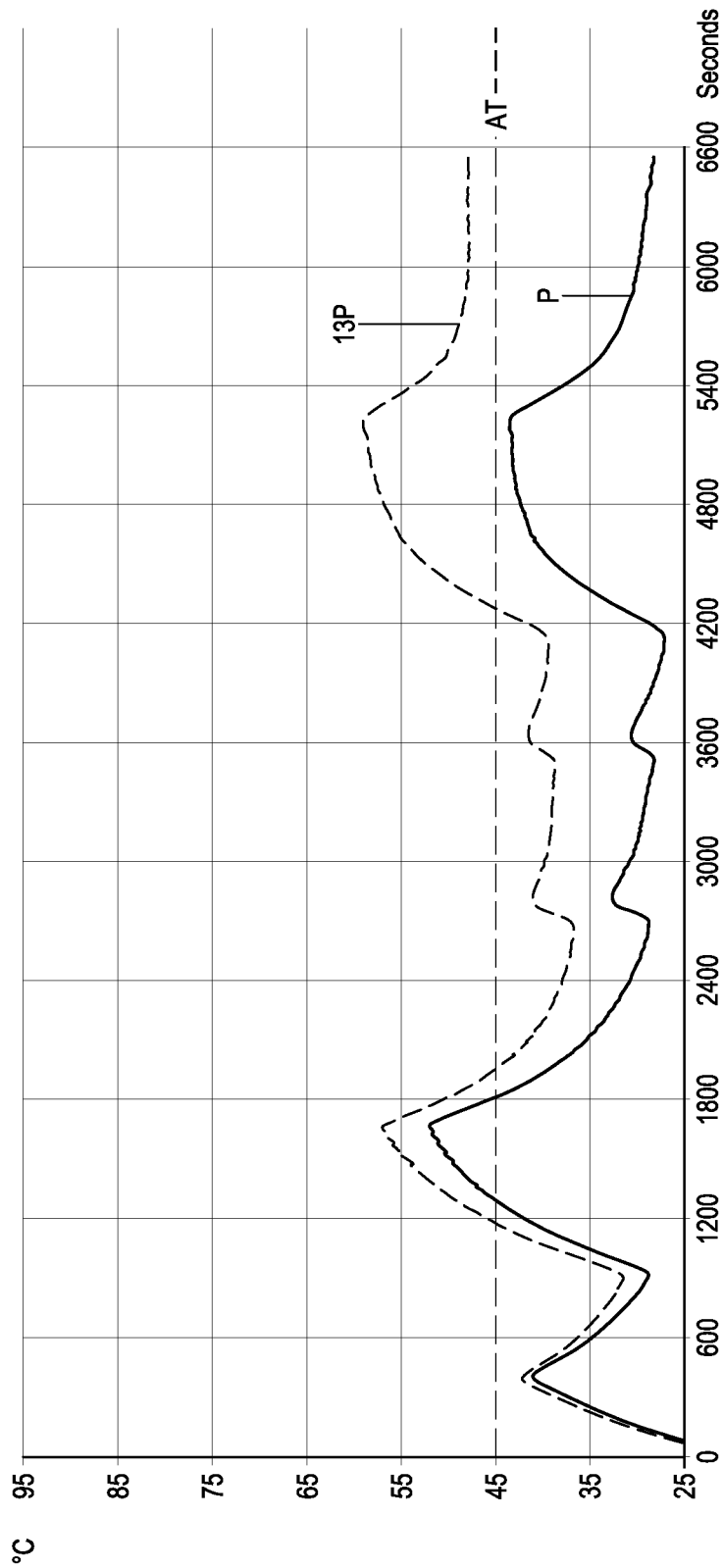
Figure 6:
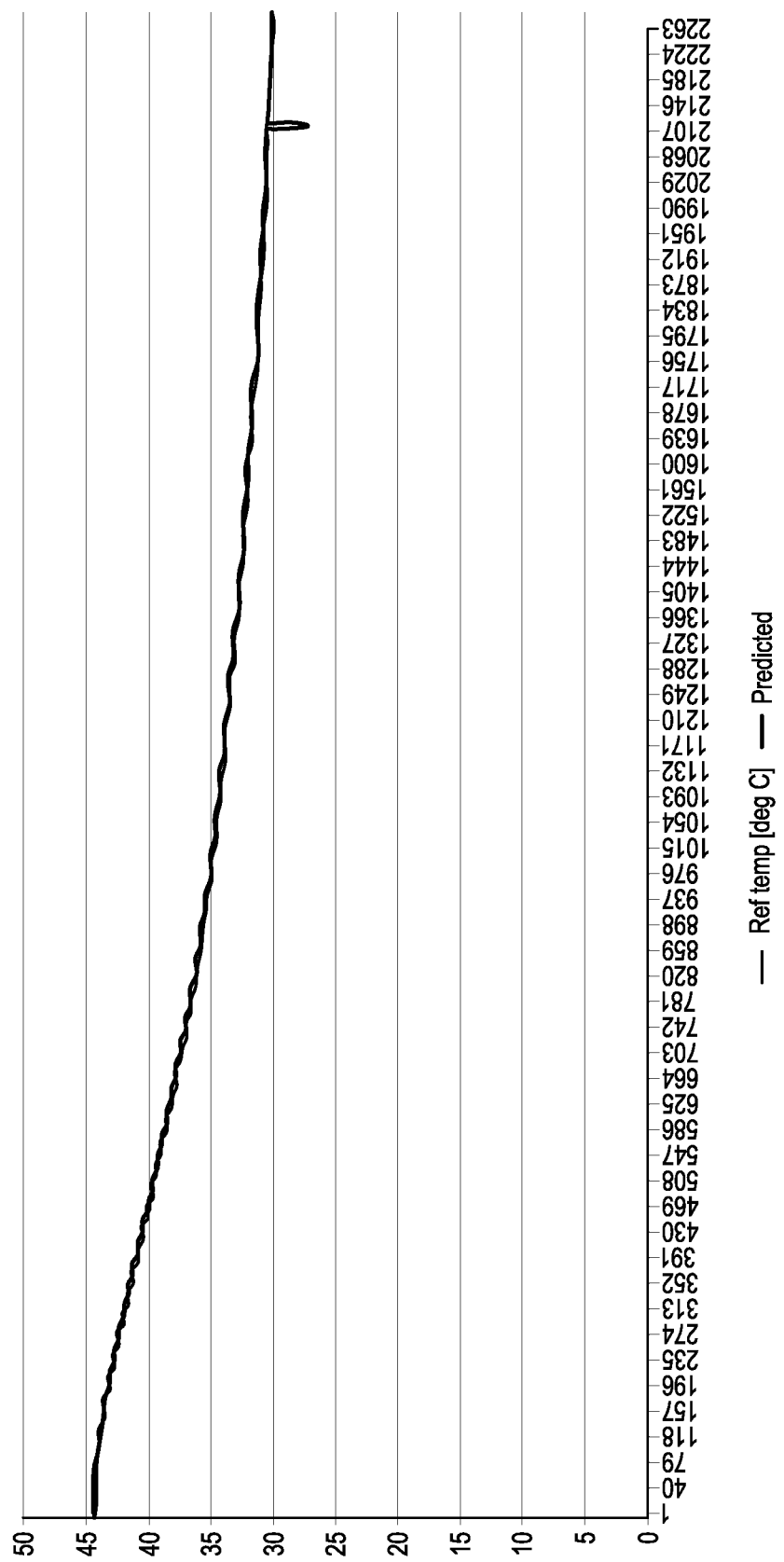

Three test experiments were run. In the first test, Example 1, the hot plate temperature was at 60° C. thus causing the textile component to experience a temperature rise from ambient to 60° C. Both first and second temperature detecting sensors were present. In the second test, Example 2, the hot plate temperature was at 80° C. thus causing the textile component to experience a temperature rise from ambient to 80° C. In the third test, Example 3, the hot plate was set to 80° C. and removed from the glove when a temperature of 40 degrees C. was reached in the glove. The glove was then allowed to cool down under ambient conditions. For all three examples, the predicted temperature from the electronic module and that actually measured by the sensor in the mannequin hand were in very close alignment as shown in FIGS. 4 to 6. The y-axis is the test temperature in degrees C. and the x-axis the elapsed time in seconds. The data collected from these three tests is presented in FIGS. 4-6.

FIG. 4 shows as "P" the temperature predicted by the algorithm and that actually recorded by the second temperature measuring sensor 17. The predicted temperature is about 10 seconds in advance of that temperature actually being achieved. This gap can be considered as being the "warning time". After about 380 seconds when the heat source was removed, the glove was then in cooling mode and the algorithm again gave a close prediction to that actually experienced.

FIG. 5 shows as "13P" the predicted temperature when only the first temperature detecting sensor 13 is present. "P" is the predicted temperature generated from data received from both the first 13 and second 17 temperature detecting sensors. This shows the value of having two temperature detecting sensors as with only one sensor line 13P shows unacceptable drift of predicted value from reality. Line AT is the alarm threshold value of 45° C. and the single sensor 13P incorrectly predicts a falsely high temperature.

FIG. 6 shows (i) the reference temperature which is the actual temperature recorded by the second temperature measuring sensor 17 and (ii) the algorithm predicted temperature for that same moment in time. Very close correlation between prediction and actual is noted.

The invention claimed is:

1. A glove for protecting the back of a hand comprises:
 a textile component and an electronic module component wherein the textile component comprises in order:
 a flame-resistant fabric having inner and outer surfaces,
 a first temperature detecting sensor located next to the inner surface of the flame-resistant fabric,
 at least one thermally insulating fabric having inner and outer surfaces, a second temperature detecting sensor located on the inner surface of the thermally insulating fabric that is closest to the skin of the wearer, and the electronic module component comprises a removable encapsulated electronic module located in a pocket of the glove, the module further comprising:

an accelerometer, a digital processor connected to the first and second temperature detecting sensors wherein the processor compares live temperature data input received from the first and second temperatures sensors, predicts via an algorithm the time until the glove protection will fail causing second degree body burn conditions to be experienced by the wearer and sends a predictive signal to an alerting device that warns the wearer of the upcoming failure event and a battery power source.

2. The glove of claim 1 further comprising a water-impermeable membrane located between the first temperature detecting sensor and the at least one thermally insulating fabric.

3. The glove of claim 1 wherein the electronic module component is detachable from the glove.

4. The glove of claim 1 wherein the alerting device is a vibrator.

5. The glove of claim 4 wherein the vibrator has a vibration frequency of between 10,000 to 20,000 rpm.

6. The glove of claim 1 wherein the battery of the electronic module is a lithium battery or a ceramic lithium battery.

7. The glove of claim 1 wherein the pocket of the glove containing the electronic module is located on the wrist section of the glove.

* * * * *